(12) United States Patent
Le Gros et al.

(10) Patent No.: US 7,852,554 B2
(45) Date of Patent: Dec. 14, 2010

(54) CRYOGENIC IMMERSION MICROSCOPE

(75) Inventors: Mark Le Gros, Berkeley, CA (US); Carolyn A. Larabell, Berkeley, CA (US)

(73) Assignee: The Regents of the University of California, Oakland, CA (US)

( * ) Notice: Subject to any disclaimer, the term of this patent is extended or adjusted under 35 U.S.C. 154(b) by 511 days.

(21) Appl. No.: 11/911,957

(22) PCT Filed: Apr. 20, 2006

(86) PCT No.: PCT/US2006/015162
§ 371 (c)(1), (2), (4) Date: Oct. 18, 2007

(87) PCT Pub. No.: WO2006/113916
PCT Pub. Date: Oct. 26, 2006

(65) Prior Publication Data
US 2008/0192341 A1      Aug. 14, 2008

Related U.S. Application Data

(60) Provisional application No. 60/673,274, filed on Apr. 20, 2005.

(51) Int. Cl.
*G02B 21/28* (2006.01)
(52) U.S. Cl. ........................ 359/391; 359/395
(58) Field of Classification Search ................. 359/368, 359/391–395; 378/34, 41–43, 210
See application file for complete search history.

(56) References Cited

U.S. PATENT DOCUMENTS

| | | | |
|---|---|---|---|
| 4,707,075 A | 11/1987 | Fukushima et al. | |
| 5,257,128 A * | 10/1993 | Diller et al. | 359/395 |
| 5,598,888 A * | 2/1997 | Sullivan et al. | 359/395 |
| 5,664,036 A * | 9/1997 | Islam | 385/31 |
| 6,413,252 B1 | 7/2002 | Zavislan | |
| 6,898,632 B2 | 5/2005 | Gordy et al. | |
| 2005/0050205 A1 | 3/2005 | Gordy et al. | |
| 2008/0068707 A1* | 3/2008 | Goodman | 359/368 |

FOREIGN PATENT DOCUMENTS

SU       1016641 A  *  5/1983

OTHER PUBLICATIONS

Schneider, "X-ray Microscopy: Methods and Perspectives", Analytical Bioanalytical Chemistry, vol. 376, pp. 558-561, (Jun. 17, 2003).
Fisher, "Network Taps Enable Passive Monitoring", http://www.networkworld.com/news/tech/2002/1028techupdate.html, (Oct. 28, 2002).
Abramowitz et al., "Immersion Media", http://micro.magnet.fsu.edu/primer/anatomy/immersion.html, Molecular Expressions, Optical Microscopy, Primer Anatomy of the Microscope, Jan. 4, 2005.
Spring et al., "Immersion Oil and Refractive Index", http://micro.magnet.fsu.edu/primer/java/microscopy/immersion.html, Molecular Expressions, Optical Microscopy, Primer Anatomy of the Microscope, Mar. 24, 2005.

* cited by examiner

*Primary Examiner*—Frank G Font
(74) *Attorney, Agent, or Firm*—Lawrence Berkeley National Laboratory; Leonard T. Guzman

(57) ABSTRACT

A cryogenic immersion microscope whose objective lens is at least partially in contact with a liquid reservoir of a cryogenic liquid, in which reservoir a sample of interest is immersed is disclosed. When the cryogenic liquid has an index of refraction that reduces refraction at interfaces between the lens and the sample, overall resolution and image quality are improved. A combination of an immersion microscope and x-ray microscope, suitable for imaging at cryogenic temperatures is also disclosed.

17 Claims, 6 Drawing Sheets

CRYOGENIC IMMERSION MICROSCOPE

CROSS-REFERENCE TO RELATED APPLICATIONS

This application claims priority to U.S. Patent Provisional Application 60/673,274, filed Apr. 20, 2005, and is a U.S. National Phase filing of Patent Application PCT/US2006/15162, filed Apr. 20, 2006, both of which are incorporated by reference herein. This application is also related to U.S. patent application Ser. No. 11/911,960, filed. Oct. 18, 2007.

STATEMENT OF GOVERNMENT INTEREST

The invention described and claimed herein was made in part utilizing funds supplied by the U.S. Department of Energy under Contract Number DE-AC03-76SF00098 and by the National Institutes of Health under Grant Number R01 GM63948-03. The U.S. government has certain rights in this invention.

FIELD OF INVENTION

The present invention relates generally to the field of microscopy, and, more specifically, to immersion microscopy at cryogenic temperatures.

BACKGROUND OF THE INVENTION

Oil and water immersion microscopes have been utilized for many years, and a wide variety of microscope designs using immersion liquids are commercially available. The fundamental features of an immersion microscope are shown in FIG. 1. A specimen 12 to be viewed is mounted on a transparent substrate 14 beneath a transparent coverslip 16. A substage light source/condenser 20 illuminates the specimen 12 through the substrate 14 and the coverslip 16.

An objective lens 24 is positioned above the coverslip 16 and the specimen 12. Light collected by the objective lens 24 passes through additional lenses and optical elements 26 of the microscope, and is sent to an image acquisition system 28 for viewing by a scientist or researcher for example. The image acquisition system 28 may be an eyepiece, CCD camera, or any other system or apparatus used to collect and/or display images of the specimen 12.

Between the objective 24 and the coverslip 16 is an index-matching liquid 30, typically some type of oil, although many different liquids may be used. The liquid 30 advantageously has an index of refraction that matches the coverslip 16 and objective 24, so that no refraction occurs at the interfaces between these components and the liquid 30.

The index matching liquid 30 between the coverslip 16 and the objective 24 increases the amount of light collected by the objective, reduces internal reflections, and improves the overall resolution and image quality produced by the microscope, especially under high magnifying powers.

Prior to the present invention, immersion microscopy had not been performed on specimens at low temperature. Although the need for obtaining magnified images of frozen specimens exists in many applications, the advantages of liquid immersion have never been achieved, due either to freezing of the index matching liquid d or melting of the frozen specimen.

SUMMARY OF THE INVENTION in one aspect, the invention comprises a microscope whose objective lens is at least partially in contact with a liquid reservoir of cryogen, in which reservoir a sample of interest is immersed. When the cryogen has an index of refraction that reduces refraction at interfaces between the lens and the sample, overall resolution and image quality are improved. Such immersion microscopy at cryogenic temperatures has not heretofore been achieved.

The invention also includes methods of performing immersion microscopy. In one embodiment, a method of microscopic imaging comprises cooling at least a portion of an objective lens and a sample to a cryogenic temperature, illuminating the sample with radiation; and collecting at least a portion of the illuminating radiation with the objective lens so as to create a magnified image of the sample.

In another embodiment, an optical microscope is combined with an x-ray microscope. This embodiment may include a sample stage configured to place samples in a path of optical illumination for optical microscopy and to also place samples in a path of x-ray illumination for x-ray microscopy. The samples may be held at a cryogenic temperature during both optical and x-ray microscopy. Thus correlations between light images and x-ray images from the same sample and at cryogenic temperatures can be made.

DETAILED DESCRIPTION OF THE INVENTION

The following detailed description is directed to certain specific embodiments of the invention. However, the invention can be embodied in a multitude of different ways. In this description, reference is made to the drawings wherein like parts are designated with like numerals throughout.

Figure 1:
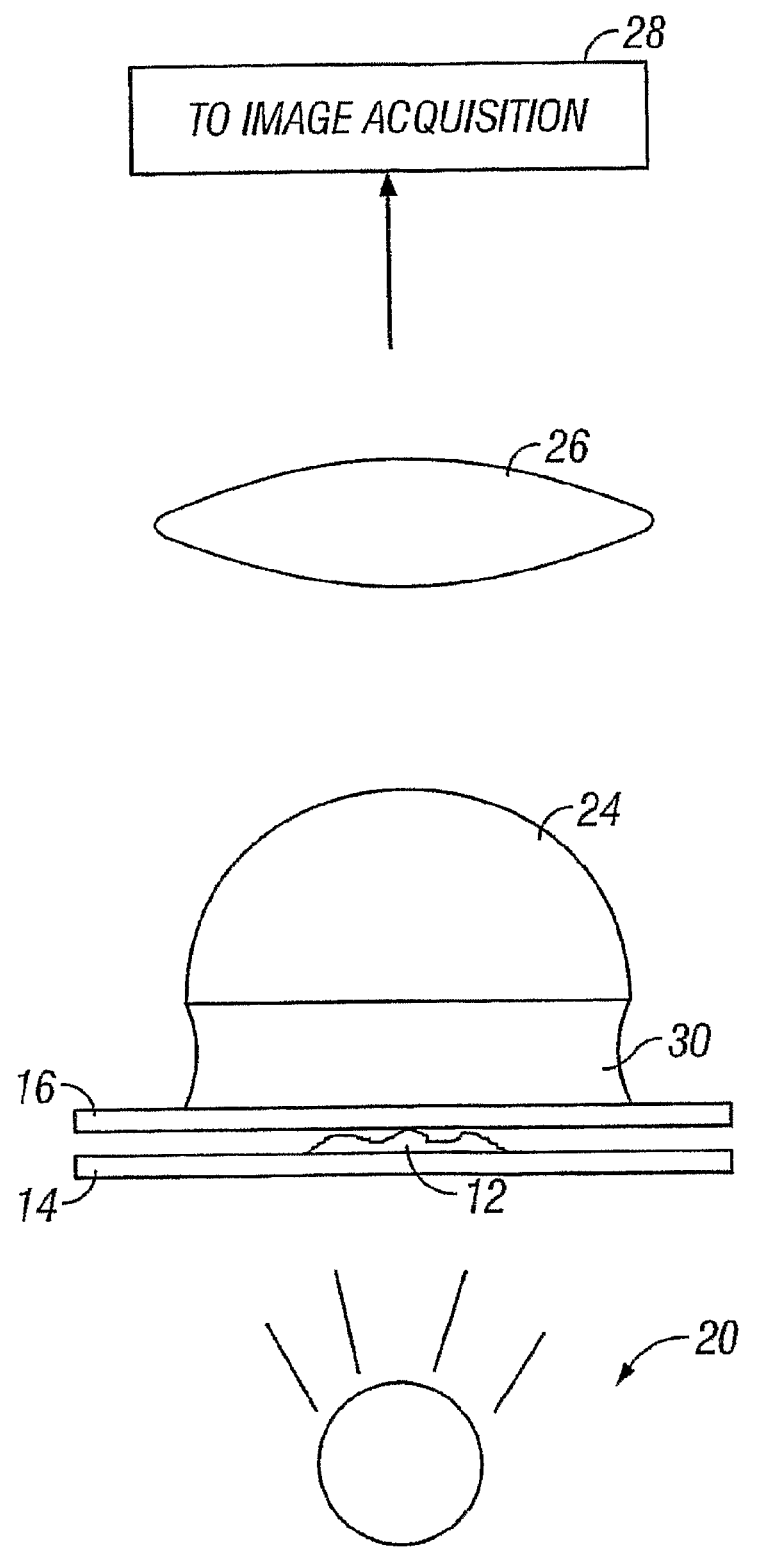
FIG. 1 is a block diagram of a conventional oil immersion microscopy system.
Figure 2:
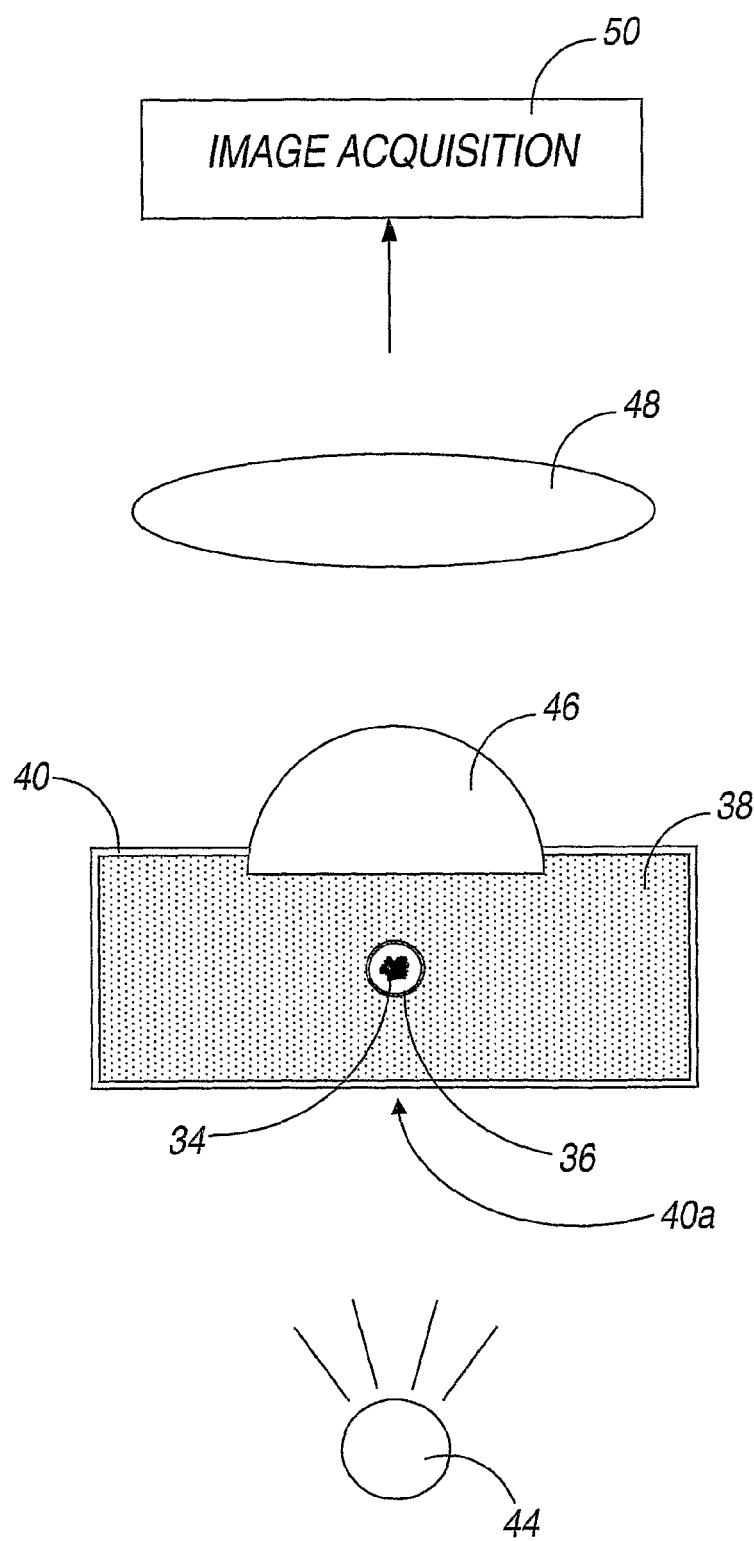
FIG. 2 is a side view of one embodiment of a cryogenic immersion microscopy system.

Referring now to FIG. 2, one embodiment of a cryogenic immersion microscope is illustrated. In this system, a specimen 34 is fixed inside a cylindrical sample holder 36. The sample holder 36 is immersed in a reservoir of a cryogenic liquid 38. The cryogenic liquid 38 is inside a container 40, which advantageously includes at least one transparent wall or wall portion 40a that allows light from a condenser/light source 44 to pass through the specimen 34 and into an objective lens 46. The objective lens 46 extends through an opening in the container 40, and is at least partially immersed in the cryogenic liquid 38, that is to say that at least one surface, the surface facing the sample holder 36, is at least partially in contact with the cryogenic liquid 38. As with the conventional microscope system described above, the objective lens 46 is optically coupled to additional imaging optics/lenses 48 and routes the image to an acquisition system 50.

With this system, the both objective lens 46 and the specimen 34 are at cryogenic temperatures, which is a novel aspect of this system. In this specification, the term "cryogenic temperature" is intended to mean temperatures less than 273 degrees K. In some embodiments, the temperature of the cryogenic liquid will be less than about 200 degrees K. In other embodiments of the invention, the temperature of the cryogenic, liquid (and thus the sample and the objective lens) is less than about 100 degrees K. A convenient temperature is approximately 77 degrees K, as that is the temperature of liquid nitrogen, an inexpensive and readily available coolant. In some arrangements the cryogenic liquid is a liquid at cryogenic temperature and atmospheric pressure and becomes a gas at standard ambient temperature and atmospheric pressure.

Furthermore, if an appropriate cryogenic liquid that has a relatively high index of refraction, the benefits of liquid immersion microscopy described above can be obtained with this instrument. In this regard, liquid propane cooled to below 100 K with liquid nitrogen has been found suitable for use as a cryogenic immersion liquid 38. Liquid propane has the desired high refraction index, and is a liquid at atmospheric pressures and liquid nitrogen temperatures. Other cryogenic liquids can be used as well. One example is isopropyl alcohol cooled with dry ice to about 190 K. Any other short chain hydrocarbon such as ethane, butane, pentane and all their isomers, halogen substituted hydrocarbons, silanes, alcohols, ethers, ketones, aromatic hydrocarbons, and mixtures thereof can also be used. A cryogenic liquid can be selected based on its being in the liquid phase at the desired experimental temperatures and pressures. It is useful that the cryogenic liquid have a refractive index somewhat close to the refractive index of the objective lens. In some embodiments, the refractive index of the cryogenic liquid is within ±15% of the refractive index of the objective lens. In some embodiments, the refractive index of the cryogenic liquid is within ±10% of the refractive index of the objective lens. In some embodiments, the refractive index of the cryogenic liquid is within ±5% of the refractive index of the objective lens. For example, the refractive index of glass is about 1.4, a useful approximation for the refractive index of some objective lenses. The refractive index of liquid propane is about 1.3.

A cryogenic immersion liquid 38 between the sample holder 36 and the objective lens 46 allows for the sample holder 36 to be cylindrical without loss of resolution. The liquid 38 significantly reduces image artifacts which would otherwise be present due to the curved interfaces and refractive index differences between the specimen 34 and the objective lens 46 in air.

Figure 3:
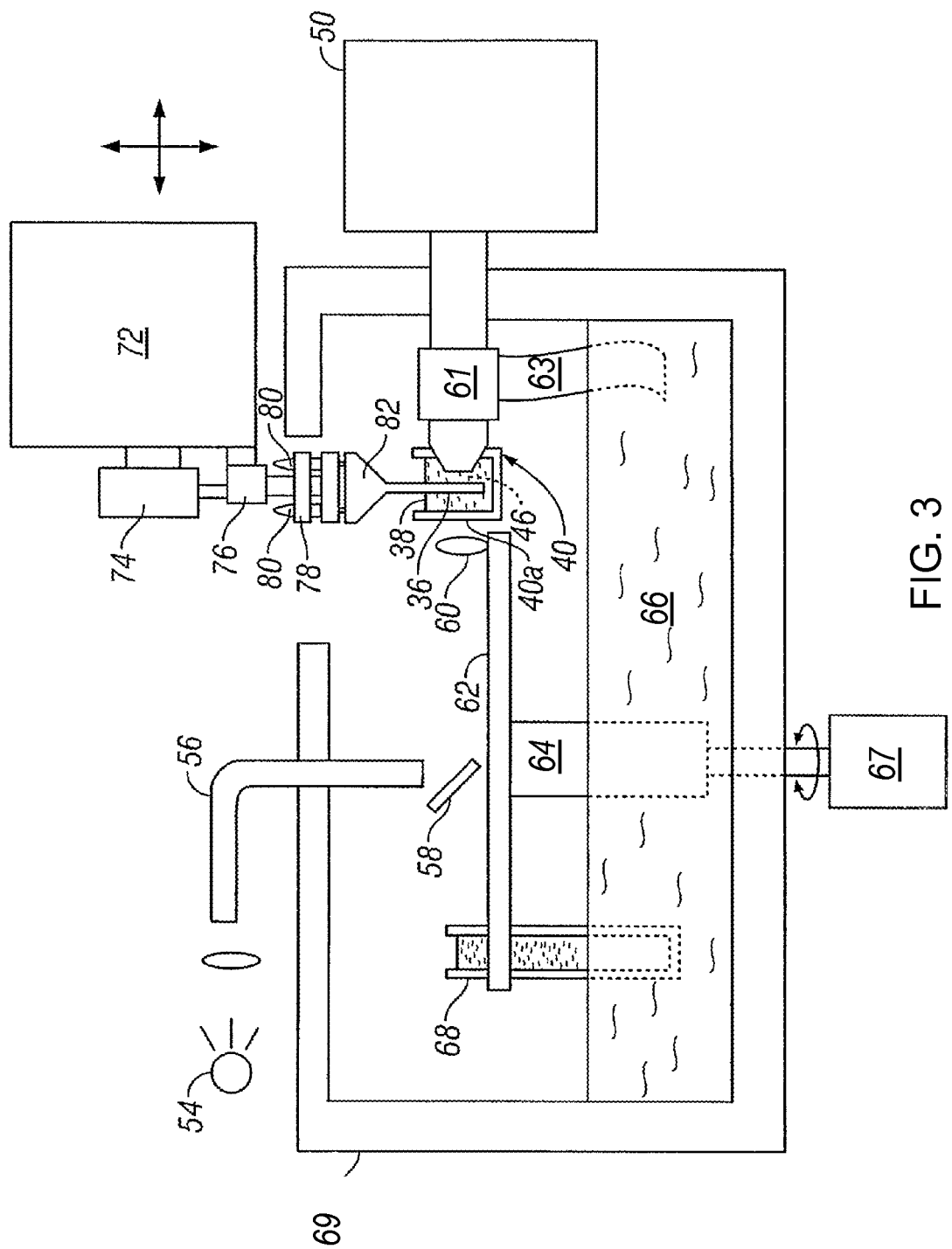
FIG. 3 is a side view of a cryogenic microscopy system with automated sample handling features.

Turning now to FIG. 3, an automated cryogenic immersion microscope system is illustrated. The sample region is as described above with reference to FIG. 2, where a sample holder 36 is immersed in a reservoir of an approximately index-matched cryogenic liquid 38 and is positioned adjacent an objective lens 46. Light from light source 54 is focused on a fiber optic light pipe 56 that routes the light to a mirror 58. The mirror 58 reflects the light to a condenser lens 60 to illuminate the sample as described above with reference to FIG. 2. As is also described above with reference to FIG. 2, an image acquisition system 50, which may for example be used for fluorescence or confocal/multiphoton microscopy, acquires the images for display, storage, and/or viewing.

In the embodiment of FIG. 3, the mirror 58 and condenser lens 60 sit adjacent a rotatable platform 62, but do not themselves rotate. A central shaft portion 64 of the platform 62 extends downward into a reservoir of cryogenic liquid 66, such as liquid nitrogen, to keep the platform 62 at cryogenic temperature. It has also been found useful to cool the housing 61 for the objective lens 46 and the container 40 for the liquid 38 with a thermally conductive strap 63 made of a material with good thermal conductivity, such as copper or aluminum, which attaches to the lens housing 61 and extends into the cryogenic liquid reservoir 66. The central shaft 64 may be coupled to a motor 67 which controls the rotational orientation of the platform 62. The housing 69 of the apparatus is preferably thermally insulating, comprising, for example, styrofoam and/or multi-walled Dewar construction.

The microscope stage comprises x,y,z stages 72 for positioning the sample relative to the imaging beam. The x,y,z, stages 72 are coupled to a harmonic rotation motor 74 for rotating the sample. The rotation motor 74 is coupled to a precision bearing 76 that allows for precision transfer of rotational motion from the rotation motor 74 to the sample. The precision bearing 76 is connected to a tilt stage 78. The tilt stage 78 comprises picomotors 80 that allow for adjustment of the tilt stage 78. The tilt stage 78 is coupled to a sample mount 82, which is adapted to hold a sample carrier 36, such as a capillary or a flat sample surface on which a sample can be placed. The angle of the tilt stage 78 can be adjusted using picomotors 80 such that when rotation motor 74 rotates, the sample carrier 36 rotates about an axis through the center of sample carrier 36 so that the sample carrier 36 does not wobble excessively through the rotation. In some embodiments, tilt stage 78 may be any suitable commercially available optical component mounting stage, such as is typically used for adjusting the tilt of lenses, etc. The angle of tilt stage 78 is controlled by precision motors 80 as described above. In one embodiment, picomotors from New Focus™ are used.

Figure 5:
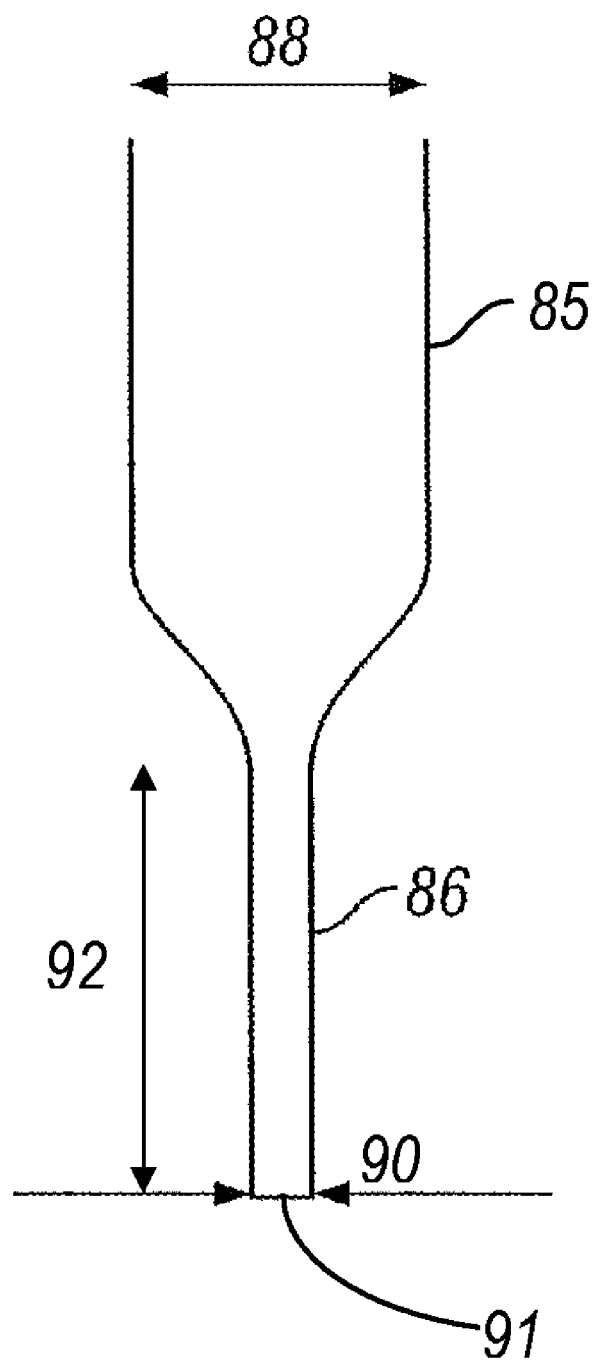
FIG. 5 is a side view of a capillary sample holder suitable for use with embodiments of the invention.

In one embodiment, the sample carrier is a capillary as illustrated in FIG. 5. The capillary can be made by softening grass tubing and stretching the softened glass to form a thin capillary using conventional glass working techniques. The capillary can then be cut to a desired size. FIG. 5 depicts a capillary 86 positioned at the end of a glass tube 85. The glass tube 85 has an upper or initial diameter 88. Capillary 86 has diameter 90 and length 92. In one embodiment, upper diameter 88 is approximately 1 millimeter. In one embodiment, capillary diameter 90 is approximately 10 microns. In one embodiment, length 92 is approximately 300 microns. In one embodiment, the diameter 90 is approximately equal to the diameter of cells that are to be imaged. Thus, a linear array of cells can fill capillary 86 for imaging. In one embodiment, samples are loaded into the capillary 86 by introducing them into the glass tube 85 and then forcing the samples into capillary 86 such as by centrifugation or increased pressure. In another embodiment, samples are loaded into the capillary 86 by applying a negative pressure to the glass tube 85 and pulling the samples into the tube through the capillary tip 91. In one embodiment, the capillary 86 comprises quartz glass. In another embodiment, the capillary 86 is Pyrex™ glass.

In one embodiment, the sample carrier is a substantially flat sample surface on which a sample can be placed. In one embodiment, the flat sample carrier comprises a silicon nitride substrate upon which the sample is placed. In another embodiment, the sample carrier is glass. It is useful to use a transparent material for the flat sample carrier.

Figure 4:
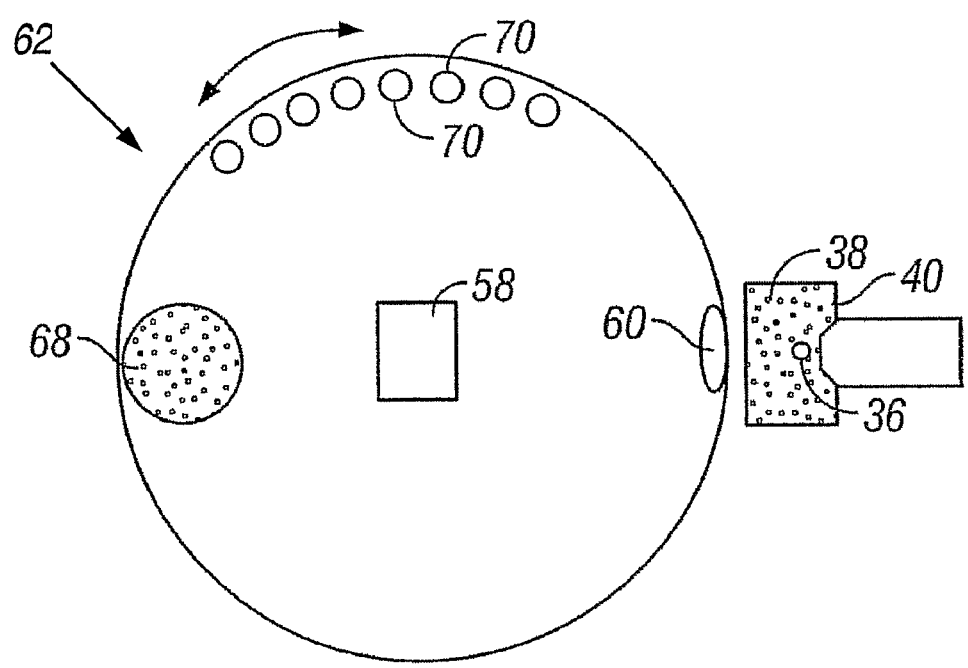
FIG. 4 is a top view of the sample handling system of FIG. 3.

Referring to FIGS. 3 and 4, the platform 62 includes holes or other mounts 70 for sample tube 36 storage. The platform also holds a freezer 68 comprising a reservoir of cryogenic liquid which can be the same as is used in the reservoir 38 associated with the objective lens, e.g. liquid propane as described above. To keep the propane or other cryogenic liquid cold, the freezer reservoir 68 may extend downward into the cryogenic liquid reservoir 66. In one arrangement, to place samples into the apparatus, the sample mount 82, coupled to the x,y,z stage 72, is removed, and a sample carrier 36 containing an unfrozen sample is placed in the mount 82. The mount 82 is then re-coupled to the x,y,z stage 72. The platform 62 is rotated to position the freezer 68 near to the sample carrier 36, and the x,y,z stage lowers the sample carrier 36 into the freezer 68. After freezing, the sample carrier 36 is raised and the platform 62 is rotated to position a storage mount 70 under the sample carrier 36. The x,y,z stage 72 lowers the sample carrier 36 into the storage mount 70 to be held in a cool environment until transferred to the imaging position. The process can be repeated as desired to load as many sample carriers 36 as there are storage mounts 70. During operation, the x,y,z stage 72 can be used to remove a sample carrier 36 from a storage location 70 and place the sample carrier 36 into the cryogenic liquid reservoir 38 for imaging as described above.

Figure 6:
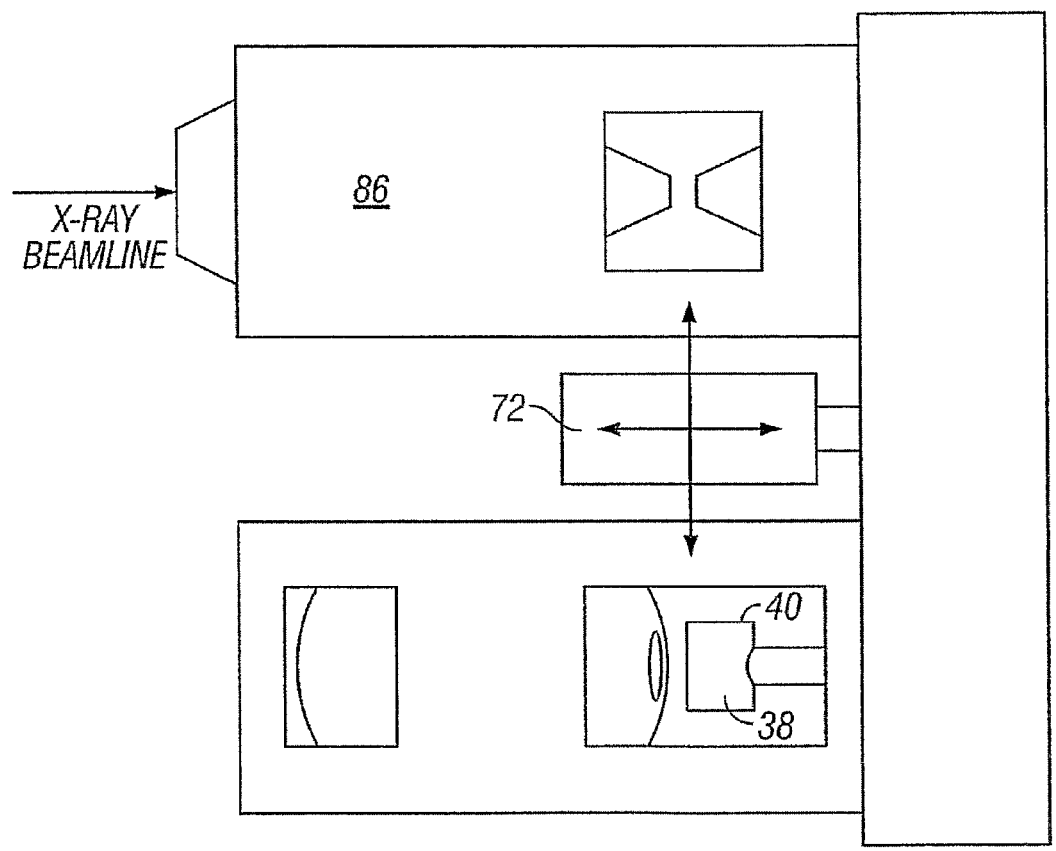
FIG. 6 is a top view of a combined cryogenic optical microscopy and cryogenic x-ray tomography system.

Referring now to FIG. 6, in one embodiment of the invention, the cryogenic optical microscope apparatus described above is combined with a cryogenic x-ray tomography unit 86. A cryogenic x-ray tomography system which utilizes a rotating capillary sample holder has been developed by the inventors, some features of which have been described in Schneider, Anal Bioanal Chem 376, 558-561 (2003), which is hereby incorporated by reference in its entirety. Additional advantageous aspects of a suitable x-ray tomography system are described in co-pending U.S. Pat. application Ser. No. 11/911,960, filed Oct. 18, 2007, entitled "Cryotomography X-ray Microscope Stage," which is incorporated by reference herein in its entirety.

In one embodiment, the cryogenic optical microscope described above is combined with an x-ray microscope by using a common x,y,z stage 72 which is configured to position a sample alternately in the cryogenic liquid reservoir 38 in an optical illumination path, and then neat to a micro zone plate in the beamline or x-ray illumination path of the x-ray (tomography) microscope 86. When using the x-ray microscope, the sample can be kept cold by being placed in a stream of He or $N_2$ gas cooled with liquid nitrogen, as described in the patent application above. Combining optical microscopy with x-ray tomography has the advantage that image features observed, with the optical microscope can be correlated with image features produced with x-ray tomography. Thus a much richer picture of the biological structures observed in cells can be obtained. The high spatial resolution and low sample temperature used in the cryogenic light microscope, allow for a much enhanced photostability of conventional fluorescent probes (on the order of 100×). This enables cell fluorescent measurements such as Fluorescent Resonance Energy Transfer (FRET) at much lower fluorescent probe concentrations, which measurements can be superposed on high spatial resolution x-ray images of unlabled cell components.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:

1. A microscope system, comprising:
   an objective lens;
   a sample mount coupled to an x, y, z stage, the sample mount configured to hold an optically transparent sample carrier wherein the sample carrier is configured to hold a sample; and
   a cryogenic liquid in direct fluid contact with at least a portion of only that surface of the objective lens which faces the sample carrier and at least a portion of the sample carrier;
   wherein a sample in the sample carrier can be imaged by the system at cryogenic temperatures.

2. The system of claim 1, further comprising:
   a platform with storage holders for storing the sample carrier at cryogenic temperatures, the platform configured to position the sample carrier for transfer to or from the sample mount.

3. The system of claim 2, further comprising a freezer reservoir on the platform, wherein the platform is configured to move the freezer reservoir near to or away from the sample carrier on the sample mount.

4. The system of claim 1 wherein the cryogenic liquid has an index of refraction that is within plus or minus 10% of the index of refraction of the objective lens.

5. The system of claim 1 wherein the sample carrier is immersed in the cryogenic liquid.

6. The system of claim 1 wherein the cryogenic liquid is selected from the group consisting of liquid propane, liquid nitrogen, isopropyl alcohol, ethane, butane, pentane and all their isomers, halogen substituted hydrocarbons, silanes, alcohols, ethers, ketones, aromatic hydrocarbons, and mixtures thereof.

7. An imaging system comprising:
   an optical microscope comprising an optical illumination path;
   an x-ray microscope comprising an x-ray illumination path; and
   a sample stage configured to place a sample alternately in the optical illumination path and in the x-ray illumination path.

8. The imaging system of claim 7, wherein the sample is inside a capillary.

9. The imaging system of claim 7, wherein the sample is at a cryogenic temperature.

10. The imaging system of claim 9, wherein the sample stage is configured to place the sample into a stream of cryogenic gas.

11. The system of claim 10 wherein the cryogenic gas comprises either helium or nitrogen and the cryogenic gas is cooled with liquid nitrogen.

12. The imaging system of claim 9, wherein the sample stage is configured to immerse the sample in a cryogenic liquid.

13. The imaging system of claim 12, wherein the cryogenic liquid comprises liquid propane.

14. A method of imaging comprising the steps of:
   a) providing a microscope system comprising:
      an objective lens;
      a sample mount configured to hold an optically transparent sample carrier;
      a cryogenic liquid in direct fluid contact with at least a portion of only that surface of the objective lens which faces the sample carrier and at least a portion of the sample carrier;
   b) adding a sample to the sample carrier;
   c) cooling the cryogenic liquid to a cryogenic temperature;
   d) allowing the sample carrier and the objective lens to cool to the cryogenic temperature;
   e) illuminating the sample with radiation; and
   f) collecting at least a portion of the radiation with the objective lens to create an image of the sample.

15. The method of claim 14, wherein allowing the sample carrier and the objective lens to cool to the cryogenic temperature comprises immersing the sample carrier and at least a portion of the surface of the objective lens facing the sample carrier in the cryogenic liquid.

16. A method for preparing a sample for cryogenic imaging, comprising the steps of:
   a) providing a microscope system comprising:
      an objective lens;
      a sample mount coupled to an x, y, z stage, the sample mount configured to hold a sample carrier;
      a cryogenic liquid in contact with at least a portion of the objective lens and at least a portion of the sample carrier;
      a platform with storage holders for storing the sample carrier at cryogenic temperatures, the platform configured to position the sample carrier for transfer to or from the sample mount; and
      a freezer reservoir on the platform, the freezer reservoir containing a cryogenic liquid, wherein the platform is configured to move the freezer reservoir near to or away from the sample carrier on the sample mount;
   b) placing the sample carrier onto the sample mount;
   c) moving the platform so that the freezer reservoir is near the sample carrier on the sample mount; and
   d) placing the sample carrier into the freezer reservoir, thereby immersing the sample carrier in the cryogenic liquid in the freezer reservoir.

17. The method of claim 16, further comprising the steps of:
   e) removing the sample carrier from the freezer reservoir;
   f) moving the platform to position a storage holder adjacent the sample carrier;
   g) placing the sample carrier into the storage holder; and
   h) moving the platform to store the storage holder and the sample carrier in a cool environment.

* * * * *